US010229628B2

(12) United States Patent
Jo

(10) Patent No.: US 10,229,628 B2
(45) Date of Patent: Mar. 12, 2019

(54) GAMMA VOLTAGE GENERATOR AND DISPLAY DEVICE INCLUDING THE SAME

(71) Applicant: SAMSUNG DISPLAY CO., LTD., Yongin-si, Gyeonggi-Do (KR)

(72) Inventor: Hyeon-Ja Jo, Cheongju-si (KR)

(73) Assignee: SAMSUNG DISPLAY CO., LTD., Yongin-si, Gyeonggi-Do (KR)

( * ) Notice: Subject to any disclaimer, the term of this patent is extended or adjusted under 35 U.S.C. 154(b) by 62 days.

(21) Appl. No.: 15/366,706

(22) Filed: Dec. 1, 2016

(65) Prior Publication Data

US 2017/0162108 A1 Jun. 8, 2017

(30) Foreign Application Priority Data

Dec. 4, 2015 (KR) ........................ 10-2015-0172719

(51) Int. Cl.
*G06F 1/00* (2006.01)
*G09G 3/20* (2006.01)

(52) U.S. Cl.
CPC ......... *G09G 3/2092* (2013.01); *G09G 3/2007* (2013.01); *G09G 2310/027* (2013.01)

(58) Field of Classification Search
CPC .. G09G 3/32; G09G 3/14; G09G 3/36; G09G 3/20; G09G 5/02
See application file for complete search history.

(56) References Cited

U.S. PATENT DOCUMENTS

2009/0190074 A1* 7/2009 Woo ........................ G02B 5/201 349/106
2015/0179103 A1* 6/2015 Tani ......................... G09G 3/20 345/690

FOREIGN PATENT DOCUMENTS

KR 1020110038496 4/2011
KR 1020150045300 4/2015

* cited by examiner

*Primary Examiner* — Michael Faragalla
(74) *Attorney, Agent, or Firm* — F. Chau & Associates, LLC

(57) ABSTRACT

A gamma voltage generator includes a reference gamma voltage generating circuit and a gamma voltage generating circuit. The reference gamma voltage generating circuit is configured to generate first reference gamma voltages, second reference gamma voltages, third reference gamma voltages, and a common reference gamma voltage. The gamma voltage generating circuit is configured to generate first gamma voltages, second gamma voltages, and third gamma voltages using the first reference gamma voltages, the second reference gamma voltages, the third reference gamma voltages, and the common reference gamma voltage.

19 Claims, 10 Drawing Sheets

FIG. 3B

| GRAYSCALE | R | G | B | GRAYSCALE | R | G | B |
|---|---|---|---|---|---|---|---|
| 1 | 10 | 9 | 10 | 26 | 5 | 2.5 | 7.5 |
| 2 | 9.8 | 8.6 | 9.9 | 27 | 4.8 | 2.4 | 7.4 |
| 3 | 9.6 | 8.2 | 9.8 | 28 | 4.6 | 2.3 | 7.3 |
| 4 | 9.4 | 7.8 | 9.7 | 29 | 4.4 | 2.2 | 7.2 |
| 5 | 9.2 | 7.4 | 9.6 | 30 | 4.2 | 2.1 | 7.1 |
| 6 | 9 | 7 | 9.5 | 31 | 4 | 2 | 7 |
| 7 | 8.8 | 6.6 | 9.4 | 32 | 3.8 | 1.9 | 6.8 |
| 8 | 8.6 | 6.2 | 9.3 | 33 | 3.6 | 1.8 | 6.6 |
| 9 | 8.4 | 5.8 | 9.2 | 34 | 3.4 | 1.7 | 6.4 |
| 10 | 8.2 | 5.4 | 9.1 | 35 | 3.2 | 1.6 | 6.2 |
| 11 | 8 | 5 | 9 | 36 | 3 | 1.5 | 6 |
| 12 | 7.8 | 4.8 | 8.9 | 37 | 2.8 | 1.4 | 5.8 |
| 13 | 7.6 | 4.6 | 8.8 | 38 | 2.6 | 1.3 | 5.6 |
| 14 | 7.4 | 4.4 | 8.7 | 39 | 2.4 | 1.2 | 5.4 |
| 15 | 7.2 | 4.2 | 8.6 | 40 | 2.2 | 1.1 | 5.2 |
| 16 | 7 | 4 | 8.5 | 41 | 2 | 1 | 5 |
| 17 | 6.8 | 3.8 | 8.4 | 42 | 1.8 | 0.9 | 4.5 |
| 18 | 6.6 | 3.6 | 8.3 | 43 | 1.6 | 0.8 | 4 |
| 19 | 6.4 | 3.4 | 8.2 | 44 | 1.4 | 0.7 | 3.5 |
| 20 | 6.2 | 3.2 | 8.1 | 45 | 1.2 | 0.6 | 3 |
| 21 | 6 | 3 | 7 | 46 | 1 | 0.5 | 2.5 |
| 22 | 5.8 | 2.9 | 7.9 | 47 | 0.8 | 0.4 | 2 |
| 23 | 5.6 | 2.8 | 7.8 | 48 | 0.6 | 0.3 | 1.5 |
| 24 | 5.4 | 2.7 | 7.7 | 49 | 0.4 | 0.2 | 1 |
| 25 | 5.2 | 2.6 | 7.6 | 50 | 0.2 | 0.1 | 0.5 |

FIG. 3C

| | R (Ω) | RRGV_C | OUT-PUT | G (Ω) | GRGV_C | OUT-PUT | B (Ω) | BRGV_C | OUT-PUT |
|---|---|---|---|---|---|---|---|---|---|
| 1 | 10 | 10 | 10 | 10 | 9 | 9 | 10 | 10 | 10 |
| 2 | 10 | | 9.8 | 10 | | 8.6 | 10 | | 9.9 |
| 3 | 10 | | 9.6 | 10 | | 8.2 | 10 | | 9.8 |
| 4 | 10 | | 9.4 | 10 | | 7.8 | 10 | | 9.7 |
| 5 | 10 | | 9.2 | 10 | | 7.4 | 10 | | 9.6 |
| 6 | 10 | | 9 | 10 | | 7 | 10 | | 9.5 |
| 7 | 10 | | 8.8 | 10 | | 6.6 | 10 | | 9.4 |
| 8 | 10 | | 8.6 | 10 | | 6.2 | 10 | | 9.3 |
| 9 | 10 | | 8.4 | 10 | | 5.8 | 10 | | 9.2 |
| 10 | 10 | | 8.2 | 10 | | 5.4 | 10 | | 9.1 |
| 11 | 10 | 8 | 8 | 10 | 5 | 5 | 10 | 9 | 9 |
| 12 | 10 | | 7.8 | 10 | | 4.8 | 10 | | 8.9 |
| 13 | 10 | | 7.6 | 10 | | 4.6 | 10 | | 8.8 |
| 14 | 10 | | 7.4 | 10 | | 4.4 | 10 | | 8.7 |
| 15 | 10 | | 7.2 | 10 | | 4.2 | 10 | | 8.6 |
| 16 | 10 | | 7 | 10 | | 4 | 10 | | 8.5 |
| 17 | 10 | | 6.8 | 10 | | 3.8 | 10 | | 8.4 |
| 18 | 10 | | 6.6 | 10 | | 3.6 | 10 | | 8.3 |
| 19 | 10 | | 6.4 | 10 | | 3.4 | 10 | | 8.2 |
| 20 | 10 | | 6.2 | 10 | | 3.2 | 10 | | 8.1 |
| 21 | 10 | 6 | 6 | 10 | 3 | 3 | 10 | 8 | 8 |
| 22 | 10 | | 5.8 | 10 | | 2.9 | 10 | | 7.9 |
| 23 | 10 | | 5.6 | 10 | | 2.8 | 10 | | 7.8 |
| 24 | 10 | | 5.4 | 10 | | 2.7 | 10 | | 7.7 |
| 25 | 10 | | 5.2 | 10 | | 2.6 | 10 | | 7.6 |
| 26 | 10 | | 5 | 10 | | 2.5 | 10 | | 7.5 |
| 27 | 10 | | 4.8 | 10 | | 2.4 | 10 | | 7.4 |
| 28 | 10 | | 4.6 | 10 | | 2.3 | 10 | | 7.3 |
| 29 | 10 | | 4.4 | 10 | | 2.2 | 10 | | 7.2 |
| 30 | 10 | | 4.2 | 10 | | 2.1 | 10 | | 7.1 |
| 31 | 10 | 4 | 4 | 10 | 2 | 2 | 10 | 7 | 7 |

FIG. 3D

| | R (Ω) | RRGV | OUT-PUT | G (Ω) | GRGV | OUT-PUT | B (Ω) | BRGV | OUT-PUT |
|---|---|---|---|---|---|---|---|---|---|
| 1 | 20 | | 10 | 40 | 9 | 9 | 10 | | 10 |
| 2 | 20 | | 9.8 | 40 | | 8.6 | 10 | | 9.9 |
| 3 | 20 | | 9.6 | 40 | | 8.2 | 10 | | 9.8 |
| 4 | 20 | | 9.4 | 40 | | 7.8 | 10 | | 9.7 |
| 5 | 20 | | 9.2 | 40 | | 7.4 | 10 | | 9.6 |
| 6 | 20 | 9 | 9 | 40 | 7 | 7 | 10 | | 9.5 |
| 7 | 20 | | 8.8 | 40 | | 6.6 | 10 | | 9.4 |
| 8 | 20 | | 8.6 | 40 | | 6.2 | 10 | | 9.3 |
| 9 | 20 | | 8.4 | 40 | | 5.8 | 10 | | 9.2 |
| 10 | 20 | | 8.2 | 40 | | 5.4 | 10 | | 9.1 |
| 11 | 20 | | 8 | 40 | 5 | 5 | 10 | 9 | 9 |
| 12 | 20 | | 7.8 | 20 | | 4.8 | 10 | | 8.9 |
| 13 | 20 | | 7.6 | 20 | | 4.6 | 10 | | 8.8 |
| 14 | 20 | | 7.4 | 20 | | 4.4 | 10 | | 8.7 |
| 15 | 20 | | 7.2 | 20 | | 4.2 | 10 | | 8.6 |
| 16 | 20 | 7 | 7 | 20 | 4 | 4 | 10 | | 8.5 |
| 17 | 20 | | 6.8 | 20 | | 3.8 | 10 | | 8.4 |
| 18 | 20 | | 6.6 | 20 | | 3.6 | 10 | | 8.3 |
| 19 | 20 | | 6.4 | 20 | | 3.4 | 10 | | 8.2 |
| 20 | 20 | | 6.2 | 20 | | 3.2 | 10 | | 8.1 |
| 21 | 20 | | 6 | 20 | | 3 | 10 | | 8 |
| 22 | 20 | | 5.8 | 10 | | 2.9 | 10 | | 7.9 |
| 23 | 20 | | 5.6 | 10 | | 2.8 | 10 | | 7.8 |
| 24 | 20 | | 5.4 | 10 | | 2.7 | 10 | | 7.7 |
| 25 | 20 | | 5.2 | 10 | | 2.6 | 10 | | 7.6 |
| 26 | 20 | 5 | 5 | 10 | | 2.5 | 10 | | 7.5 |
| 27 | 20 | | 4.8 | 10 | | 2.4 | 10 | | 7.4 |
| 28 | 20 | | 4.6 | 10 | | 2.3 | 10 | | 7.3 |
| 29 | 20 | | 4.4 | 10 | | 2.2 | 10 | | 7.2 |
| 30 | 20 | | 4.2 | 10 | | 2.1 | 10 | | 7.1 |
| 31 | 20 | 4 | 4 | 10 | | 2 | 10 | 7 | 7 |

GAMMA VOLTAGE GENERATOR AND DISPLAY DEVICE INCLUDING THE SAME

CROSS-REFERENCE TO RELATED APPLICATION

This application claims priority under 35 U.S.C. § 119 to Korean Patent Application No. 10-2015-0172719, filed on Dec. 4, 2015 in the Korean Intellectual Property Office (KIPO), the disclosure of which is incorporated by reference herein in its entirety.

TECHNICAL FIELD

Exemplary embodiments of the inventive concept relate to a display device, and more particularly, to a gamma voltage generator and a display device including the gamma voltage generator.

DISCUSSION OF RELATED ART

An organic light emitting display device includes a source driver and a display panel. The source driver generates gamma voltages for grayscales (e.g., grayscale data) and generates a data voltage corresponding to input data (e.g., grayscales in the input data), which is provided from an external device, using the gamma voltages. In this case, a pixel included in the display panel emits a light corresponding to the data voltage. In addition, the source driver sets or determines reference gamma voltages, which correspond to certain grayscales, for sub pixels (e.g., included in the pixel) using gamma characteristics of the sub pixels, and generates the gamma voltages for the sub pixels by distributing or interpolating the reference gamma voltages.

Power consumption may increase as resolution of the display panel increases. Recently, some display devices use a gamma integrated circuit, which is different from (or independent to) the source driver, to generate the reference gamma voltages.

SUMMARY

According to an exemplary embodiment of the inventive concept, a gamma voltage generator may include a reference gamma voltage generating circuit and a gamma voltage generating circuit. The reference gamma voltage generating circuit is configured to generate first reference gamma voltages, second reference gamma voltages, third reference gamma voltages, and a common reference gamma voltage. The gamma voltage generating circuit is configured to generate first gamma voltages, second gamma voltages, and third gamma voltages using the first reference gamma voltages, the second reference gamma voltages, the third reference gamma voltages, and the common reference gamma voltage.

The reference gamma voltage generating circuit may generate the common reference gamma voltage using a common reference gamma voltage level which is substantially equal to at least two selected reference gamma voltage levels among first reference gamma voltage levels for a first sub pixel, second reference gamma voltage levels for a second sub pixel, and third reference gamma voltage levels for a third sub pixel. The reference gamma voltage generating circuit may generate the first reference gamma voltages, the second reference gamma voltages, and the third reference gamma voltages using the first reference gamma voltage levels, second reference gamma voltage levels, and third reference gamma voltage levels, excluding the at least two selected reference gamma voltage levels.

The first reference gamma voltage levels may be determined using a first gamma characteristic of the first sub pixel, the second reference gamma voltage levels may be determined using a second gamma characteristic of the second sub pixel, and the third reference gamma voltage levels may be determined using a third gamma characteristic of the first sub pixel.

The gamma voltage generating circuit may include a first resistor string configured to generate the first gamma voltages by interpolating the first reference gamma voltages and the common reference gamma voltage and a second resistor string configured to generate the second gamma voltages by interpolating the second reference gamma voltages and the common reference gamma voltage.

The gamma voltage generating circuit may further include a third resistor string configured to generate the third gamma voltages by interpolating the third reference gamma voltages and the common reference gamma voltage.

The first resistor string may include a first resistor having a first resistance and a second resistor having a second resistance, where the first resistance of the first resistor is different from the second resistance of the second resistor.

The first resistor and the second resistor may be connected between a first node and a second node. The first node may receive the common reference gamma voltage, and the second node may receive one of the first reference gamma voltages.

The first resistance of the first resistor may be determined in proportion to a voltage across the first resistor.

The reference gamma voltage generating circuit may be implemented as a gamma integrated circuit, and the reference gamma voltage generating circuit may include channels to output the first reference gamma voltages, the second reference gamma voltages, the third reference gamma voltages, and the common reference gamma voltage.

The gamma voltage generating circuit may be included in a driving integrated circuit which is different from the gamma integrated circuit.

According to an exemplary embodiment of the inventive concept, a gamma voltage generator may include a reference gamma voltage generating circuit configured to generate common reference gamma voltages and a gamma voltage generating circuit configured to generate first gamma voltages, second gamma voltages, and third gamma voltages using the common reference gamma voltages.

The reference gamma voltage generating circuit may generate the common reference gamma voltages using common reference gamma voltage levels. Each of the common reference gamma voltage levels is substantially equal to at least two reference gamma voltage levels among first reference gamma voltage levels for a first sub pixel, second reference gamma voltage levels for a second sub pixel, and third reference gamma voltage levels for a third sub pixel. The common reference gamma voltage levels are different from one another.

The first reference gamma voltage levels may be determined using a first gamma characteristic of the first sub pixel, the second reference gamma voltage levels may be determined using a second gamma characteristic of the second sub pixel, and the third reference gamma voltage levels may be determined using a third gamma characteristic of the third sub pixel.

The gamma voltage generating circuit may include a first resistor string configured to generate the first gamma voltages by interpolating the common reference gamma voltages, a second resistor string configured to generate the second gamma voltages by interpolating the common reference gamma voltages, and a third resistor string configured to generate the third gamma voltages by interpolating the common reference gamma voltages.

The first resistor string may include a first resistor having a first resistance and a second resistor having a second resistance, where the first resistance of the first resistor is different from the second resistance of the second resistor.

The first resistor and the second resistor may be connected between a first node and a second node. The first node may receive a first common reference voltage among the common reference gamma voltages, the second node may receive a second common reference voltage among the common reference gamma voltages, and a voltage difference between the first common reference gamma voltage and the second common reference gamma voltage may be less than a predetermined threshold.

The first resistance of the first resistor may be determined in proportion to a voltage across the first resistor.

The reference gamma voltage generating circuit may be implemented as a gamma integrated circuit, and the reference gamma voltage generating circuit may include channels to output the common reference gamma voltages.

The gamma voltage generating circuit may be included in a driving integrated circuit which is different from the gamma integrated circuit.

According to an exemplary embodiment of the inventive concept, a display device may include a display panel, a gamma voltage generator, and a data driver. The display panel includes a first sub pixel, a second sub pixel, and a third sub pixel. The gamma voltage generator is configured to generate first gamma voltages for the first sub pixel, second gamma voltages for the second sub pixel, and third gamma voltages for the third sub pixel. The data driver is configured to generate a data signal in response to the first gamma voltages, the second gamma voltages, the third gamma voltages, and input image data provided from an external device. The gamma voltage generator may include a reference gamma voltage generating circuit and a gamma voltage generating circuit. The reference gamma voltage generating circuit is configured to generate first reference gamma voltages, second reference gamma voltages, third reference gamma voltages, and a common reference gamma voltage. The gamma voltage generating circuit is configured to generate the first gamma voltages, the second gamma voltages, and the third gamma voltages using the first reference gamma voltages, the second reference gamma voltages, the third reference gamma voltages, and the common reference gamma voltage.

BRIEF DESCRIPTION OF THE DRAWINGS

The above and other features will be more clearly understood by describing in detail exemplary embodiments thereof with reference to the accompanying drawings.

FIG. 3B is a table illustrating an example of gamma voltages according to the gamma characteristic curve of FIG. 3A according to an exemplary embodiment of the inventive concept.

FIG. 3C is a table illustrating an example of gamma voltages generated by a conventional gamma voltage generator.

FIG. 3D is a table illustrating an example of gamma voltages generated by the gamma voltage generator of FIG. 2A according to an exemplary embodiment of the inventive concept.

DETAILED DESCRIPTION OF EMBODIMENTS

Figure 1:
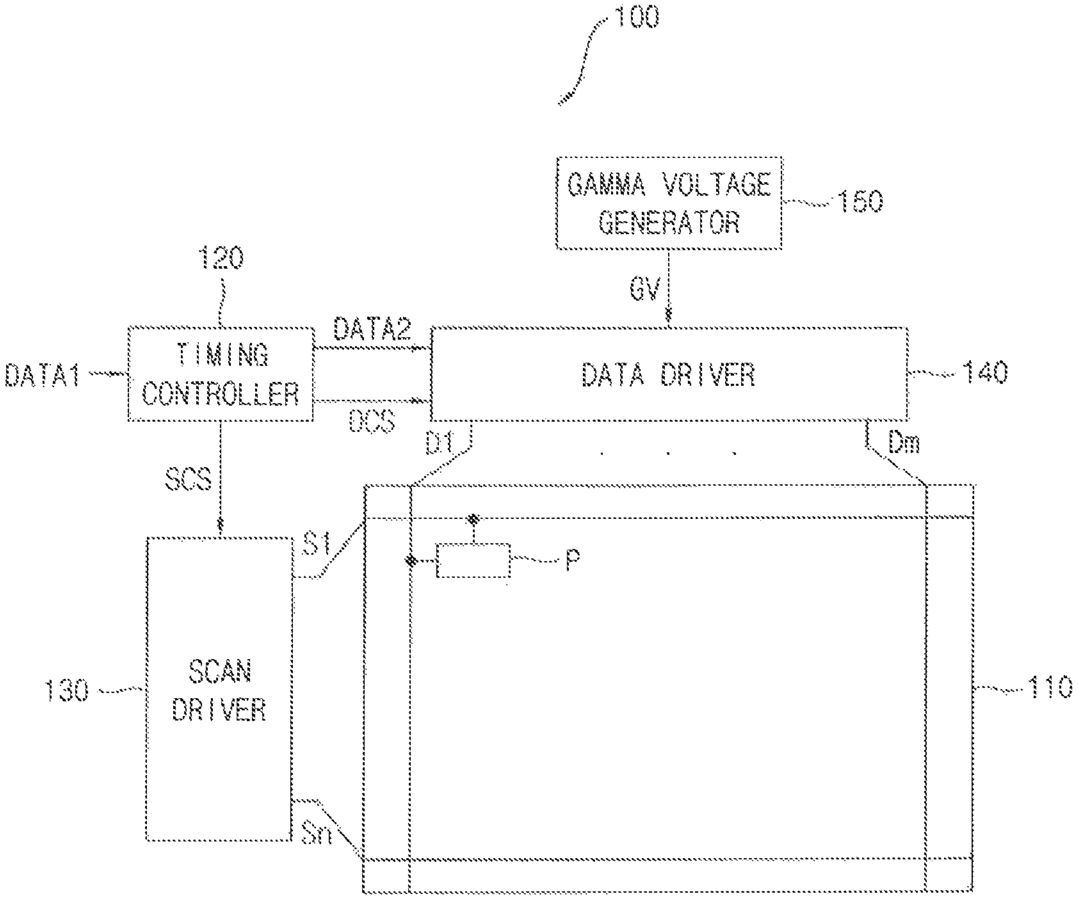
FIG. 1 is a block diagram illustrating a display device according to an exemplary embodiment of the inventive concept.

Exemplary embodiments of the inventive concept will be described more fully hereinafter with reference to the accompanying drawings. Like reference numerals refer to like elements throughout the accompanying drawings.

Exemplary embodiments of the inventive concept provide a gamma voltage generator to reduce the number of channels for reference gamma voltages.

Exemplary embodiments of the inventive concept also provide a display device with reduced production costs.

FIG. 1 is a block diagram illustrating a display device according to an exemplary embodiment of the inventive concept.

Referring to FIG. 1, a display device 100 may include a display panel 110, a timing controller 120, a scan driver 130, a data driver 140, and a gamma voltage generator 150. The display device 100 may display an image based on image data provided from an outside source or an external device. The display device 100 may be, for example, an organic light emitting display device.

The display panel 110 may include scan lines S1 through Sn, data lines D1 through Dm, and a pixel P, where each of m and n is an integer greater than or equal to 2. The pixel P may be one of a plurality of pixels. The pixel P may store a data signal in response to a scan signal and may emit a light based on the stored data signal. The pixel P may include a first sub pixel, a second sub pixel, and a third sub pixel. For example, the first sub pixel may emit a light with a first color (e.g., a red color), the second sub pixel may emit a light with a second color (e.g., a green color), and the third sub pixel may emit a light with a third color (e.g., a blue color), The timing controller 120 may control the scan driver 130 and the data driver 140. The timing controller 120 may generate a scan driving control signal SCS and may provide the scan driving control signal SCS to the scan driver 130. Here, the scan driving control signal SCS may include a start pulse and clock signals. In addition, the timing controller 120 may generate a data driving control signal DCS and may convert first data DATA1 into second data DATA2. Here, the second input data DATA2 may be in a data form (or, a data format) useable by the data driver 140.

The scan driver 130 may generate the scan signal based on the scan driving control signal SCS. The scan driver 130 may include a shift register sequentially generating the scan signal corresponding to the start pulse and the clock signals of the scan driving control signal SCS.

The data driver 140 may generate a data voltage corresponding to a grayscale (e.g., a grayscale value, grayscale data) using gamma voltage GV. The gamma voltage GV may be provided from the gamma voltage generator 150, the grayscale may be data or a value corresponding to one of the plurality of pixels (e.g., the pixel P) among the second input data DATA2, and the data voltage may be a data signal corresponding to the pixel P.

The gamma voltage generator 150 may set or determine reference gamma voltage levels based on a gamma characteristic of the pixel P and may generate reference gamma voltages based on the reference gamma voltage levels. Here, the gamma voltage generator 150 may generate a common reference gamma voltage based on some reference gamma voltage levels which are substantially the same (e.g., having substantially the same value). In addition, the gamma voltage generator 150 may generate gamma voltages by distributing or interpolating the reference gamma voltages and the common reference gamma voltage.

As described above, the pixel P may include the first sub pixel, the second sub pixel, and the third sub pixel. In this case, the gamma voltage generator 150 may set or determine first reference gamma voltages based on a first gamma characteristic of the first sub pixel, second reference gamma voltages based on a second gamma characteristic of the second sub pixel, and third reference gamma voltages based on a third gamma characteristic of the third sub pixel. In addition, the gamma voltage generator 150 may generate the common reference gamma voltage based on a common reference gamma voltage level which is equal to (or, substantially the same as) at least two reference gamma voltage levels among first reference gamma voltage levels, second reference gamma voltage levels, and third reference gamma voltage levels. Furthermore, the gamma voltage generator 150 may generate first reference gamma voltages, second reference gamma voltages, and third reference gamma voltages based on the first reference gamma voltage levels, the second reference gamma voltage levels, and the third reference gamma voltage levels, excluding the at least two reference gamma voltage levels used for determining the common reference gamma voltage level (e.g., the rest of the reference gamma voltage levels except the common reference gamma voltage level).

As an example, a circuit (e.g., a reference gamma voltage generating block in the gamma voltage generator 150) to generate the reference gamma voltages may be implemented as an integrated circuit (e.g., a gamma integrated circuit (IC) which is different or separate from a driving integrated circuit), and this circuit may generate the common gamma reference voltage corresponding to at least two reference gamma voltage levels having substantially the same value. Therefore, the number of output channels of the circuit may be reduced to be less than the number of output channels of a conventional gamma voltage generating block that generates only reference gamma voltages (and not the common reference gamma voltage). A configuration to generate the common reference gamma voltage will be described in detail below with reference to FIGS. 3A through 3D.

According to exemplary embodiments of the inventive concept, the gamma voltage generator 150 may generate the first gamma voltages, the second gamma voltages, and the third gamma voltages based on the first reference gamma voltages, the second reference gamma voltages, the third reference gamma voltages, and the common reference gamma voltage. For example, the gamma voltage generator 150 may generate the first gamma voltages by distributing or interpolating the first reference gamma voltages and the common reference gamma voltage, the second gamma voltages by distributing or interpolating the second reference gamma voltages and the common reference gamma voltage, and the third gamma voltages by distributing or interpolating the third reference gamma voltages and the common reference gamma voltage.

According to exemplary embodiments of the inventive concept, the gamma voltage generator 150 may include a first resistor string (or, a first resistor array, a first resistance string, etc.) and a second resistor string. The first resistor string may generate the first gamma voltages by distributing the first reference gamma voltages and the common reference gamma voltage, and the second resistor string may generate the second gamma voltages by distributing the second reference gamma voltages and the common reference gamma voltage. In addition, the gamma voltage generator 150 may further include a third resistor string. The third resistor string may generate the third gamma voltages by distributing the third reference gamma voltages and the common reference gamma voltage.

According to exemplary embodiments of the inventive concept, the first resistor string may include a first resistor which has a first resistance and a second resistor which has a second resistance. The first resistance may be different from the second resistance. In other words, the first resistor string may have resistors that have different resistances. In this case, even though reference gamma voltages (or, reference gamma voltage levels) are determined regardless of the gamma characteristic (e.g., the first gamma characteristic of the first sub pixel or the second gamma characteristic of the second sub pixel), the gamma voltage generator 150 may generate gamma voltages (e.g., the first gamma voltages or the second gamma voltages). Similarly, each of the second resistor string and the third resistor string may have resistors that have different resistances. The first resistor and the second resistor will be described in detail below with reference to FIGS. 3B through 3D.

The display device 100 may further include a power supply. The power supply may generate a driving power to drive the display device 100. The driving power may include a first power voltage and a second power voltage. The first power voltage may be greater than the second power voltage.

As described above, the display device 100 may generate the common reference gamma voltage by setting or determining some reference gamma voltage levels, which are substantially the same, as the common reference gamma voltage level. Therefore, the display device 100 may reduce the number of the output channels of the circuit (e.g., the gamma voltage generator 150) to generate the reference gamma voltage and may reduce production costs of the display device. In addition, the display device 100 may set or determine the reference gamma voltage levels regardless of (or, independent of) the gamma characteristic of the pixel P and may generate the gamma voltages based on the reference gamma voltage levels by using resistors having difference resistances.

FIG. 1 illustrates an example where the gamma voltage generator 150 generates only one common reference gamma voltage. However, the inventive concept is not limited thereto. For example, the gamma voltage generator 150 may generate two or more common reference gamma voltages. For example, the gamma voltage generator 150 may generate only common reference gamma voltages when the first reference gamma voltage levels are substantially equal to the second reference gamma voltage levels.

Figure 2A:
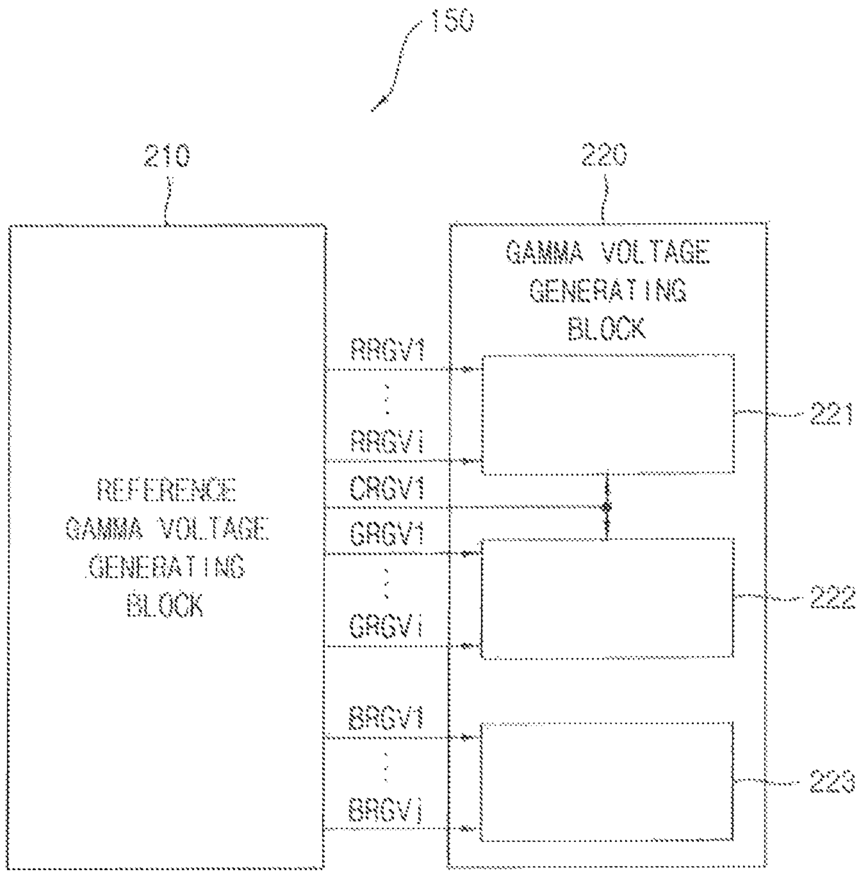
FIG. 2A is a block diagram illustrating an example of a gamma voltage generator included in the display device of FIG. 1 according to an exemplary embodiment of the inventive concept.

FIG. 2A is a block diagram illustrating an example of a gamma voltage generator included in the display device of FIG. 1 according to an exemplary embodiment of the inventive concept.

Referring to FIGS. 1 and 2A, the gamma voltage generator 150 may include a reference gamma voltage generating block 210 (or, a first block) and a gamma voltage generating block 220 (or, a second block).

The reference gamma voltage generating block 210 may generate first reference gamma voltages RRGV1 through RRGVi, second reference gamma voltages GRGV1 through GRGVi, third reference gamma voltages BRGV1 through BRGVj, and a first common reference gamma voltage CRGV1, where each of i and j is a positive integer. For example, the reference gamma voltage generating block 210 may generate the first reference gamma voltages RRGV1 through RRGVi based on first reference gamma voltage levels. Here, the first reference gamma voltage levels may be predetermined based on the first gamma characteristic of the first sub pixel, and the first reference gamma voltage levels may include first through (i+1)th red reference gamma voltage levels. The reference gamma voltage generating block 210 may generate the second reference gamma voltages GRGV1 through GRGVi based on second reference gamma voltage levels. Here, the second reference gamma voltage levels may be predetermined based on the second gamma characteristic of the second sub pixel, and the second reference gamma voltage levels may include first through (i+1)th green reference gamma voltage levels. The reference gamma voltage generating block 210 may generate the third reference gamma voltages BRGV1 through BRGVj based on third reference gamma voltage levels. Here, the third reference gamma voltage levels may be predetermined based on the third gamma characteristic of the third sub pixel, and the third reference gamma voltage levels may include first through (j)th blue reference gamma voltage levels. In addition, the reference gamma voltage generating block 210 may generate the first common reference gamma voltage CGGV1 based on the first reference gamma voltage levels, the second reference gamma voltage levels, and the third reference gamma voltage levels.

In other words, the reference gamma voltage generating block 210 may generate the first common reference gamma voltage CRGV1 corresponding to some reference gamma voltage levels (e.g., the (i+1)th red reference gamma voltage level and the (i+1)th green reference gamma voltage level), which are substantially the same, among the first reference gamma voltage levels, the second reference gamma voltage levels, and the third reference gamma voltage levels. After this, the reference gamma voltage generating block 210 may generate the first reference gamma voltages RRGV1 through RRGVi, the second reference gamma voltages GRGV1 through GRGVi, and the third reference gamma voltages BRGV1 through BRGVj, which respectively correspond to the rest of the reference gamma voltage levels (e.g., the first through (i)th red reference gamma voltage levels, the first through (i)th green reference gamma voltage levels, and the first through (j)th blue reference gamma voltage levels).

When the reference gamma voltage generating block 210 is implemented as a gamma integrated circuit, the reference gamma voltage generating block 210 may include channels which output the first reference gamma voltages RRGV1 through RRGVi, the second reference gamma voltages GRGV1 through GRGVi, the third reference gamma voltages BRGV1 through BRGVj, and the first common reference gamma voltage CRGV1. In this case, the reference gamma voltage generating block 210 may reduce the number of channels compared to a conventional reference gamma voltage generating block which generates no common reference gamma voltage. In addition, the number of channels of the reference gamma voltage generating block 210 may be further reduced as the number of common reference gamma voltages (such as the first common reference gamma voltage CRGV1) is increased.

The gamma voltage generating block 220 may generate first gamma voltages, second gamma voltages, and third gamma voltages based on the first reference gamma voltages RRGV1 through RRGVi, the second reference gamma voltages GRGV1 through GRGVi, the third reference gamma voltages BRGV1 through BRGVj, and the first common reference gamma voltage CRGV1. Here, the first gamma voltages may be used to generate a first data voltage of the first sub pixel, the second gamma voltages may be used to generate a second data voltage of the second sub pixel, and the third gamma voltages may be used to generate a third data voltage of the third sub pixel.

As illustrated in FIG. 2A, the gamma voltage generating block 220 may include a first sub gamma voltage generating block 221, a second sub gamma voltage generating block 222, and a third sub gamma voltage generating block 223. The first sub gamma voltage generating block 221 may generate the first gamma voltages based on the first reference gamma voltages RRGV1 through RRGVi and the first common reference gamma voltage CRGV1. The second sub gamma voltage generating block 222 may generate the second gamma voltages based on the second reference gamma voltages GRGV1 through GRGVi and the first common reference gamma voltage CRGV1. The third sub gamma voltage generating block 223 may generate the third gamma voltages based on the third reference gamma voltages BRGV1 through BRGVj and the first common reference gamma voltage CRGV1.

FIG. 2A illustrates an example of the gamma voltage generator 150. However, the inventive concept is not limited thereto. For example, the gamma voltage generator 150 may generate a plurality of common reference gamma voltages and may generate the first through third gamma voltages based on the plurality of common reference gamma voltages.

Figure 2B:
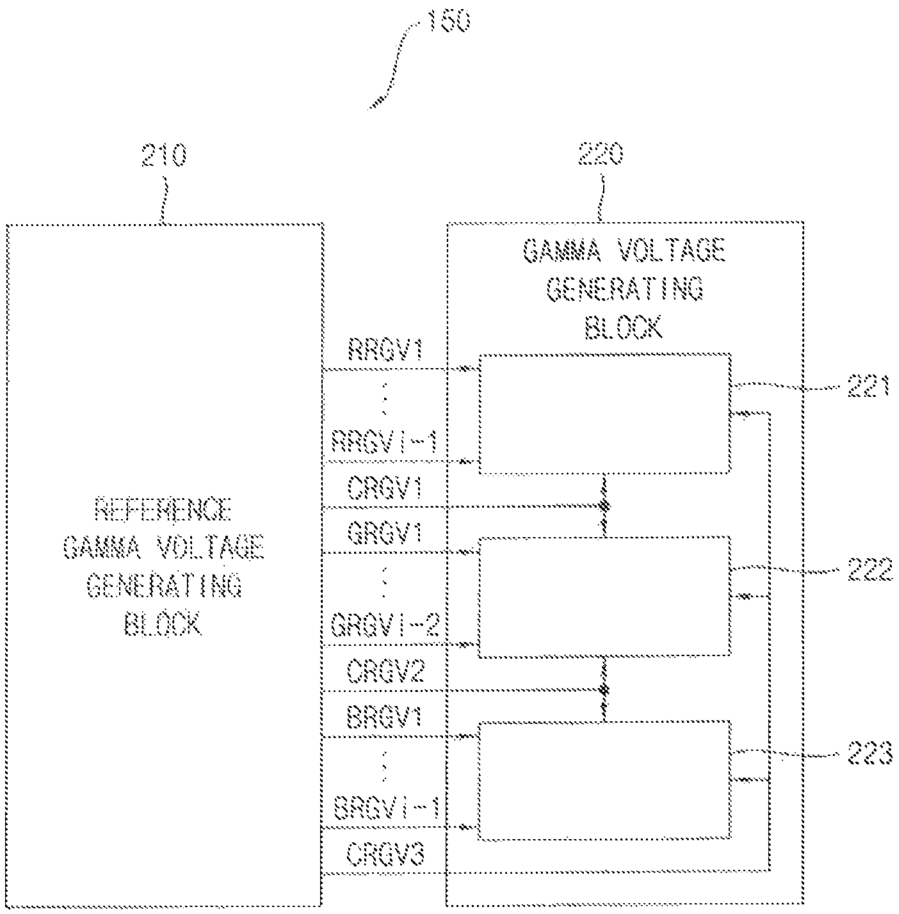
FIG. 2B is a block diagram illustrating an example of a gamma voltage generator included in the display device of FIG. 1 according to an exemplary embodiment of the inventive concept.

FIG. 2B is a block diagram illustrating an example of a gamma voltage generator included in the display device of FIG. 1 according to an exemplary embodiment of the inventive concept.

Referring to FIGS. 2A and 2B, the gamma voltage generator 150 of FIG. 2B may include the reference gamma voltage generating block 210 and the gamma voltage generating block 220. The reference gamma voltage generating block 210 and the gamma voltage generating block 220 may be substantially the same as the reference gamma voltage generating block 210 and the gamma voltage generating block 220 illustrated in FIG. 2A. However, the reference gamma voltage generating block 210 illustrated in FIG. 2B may generate common reference gamma voltages CRGV1 through CRGV3 and the gamma voltage generating block 220 illustrated in FIG. 2B may generate the first through third gamma voltages based on the common reference gamma voltages CRGV1 through CRGV3.

For example, first reference gamma voltage levels may include a first common reference gamma voltage level and a third common reference gamma voltage level. Here, the first common reference gamma voltage level may be substantially equal to one of the second reference gamma voltage levels, and the third common reference gamma voltage level may be substantially equal to another of the second reference gamma voltage levels and one of the third reference gamma voltage levels. In addition, the second reference gamma voltage levels may include a second common reference gamma voltage level, the first common reference gamma voltage level, and the third common reference gamma voltage level. Here, the second gamma common reference gamma voltage level may be substantially equal to one of the first reference gamma voltage levels.

In this case, the reference gamma voltage generating block 210 may generate the first common reference gamma voltage CRGV1, the second common reference gamma voltage CRGV2, and the third common reference gamma voltage CRGV3 which correspond to the first common reference gamma voltage level, the second common reference gamma voltage level, and the third common reference gamma voltage level, respectively. In addition, the reference gamma voltage generating block 210 may generate first through (i−1)th red reference gamma voltages RRGV1 through RRGVi−1, first through (i−2)th green reference gamma voltages GRGV1 through GRGVi−2, and first through (i−1)th blue reference gamma voltages BRGV1 through BRGVi−1, which correspond to the rest of the reference gamma voltage levels. Therefore, the reference gamma voltage generating block 210 illustrated in FIG. 2B may include channels, where the number of channels is less than the number of channels of the reference gamma voltage generating block 210 illustrated in FIG. 2A.

The gamma voltage generating block 220 may generate the first gamma voltages, the second gamma voltages, and the third gamma voltages based on the first through (i−1)th red reference gamma voltages RRGV1 through RRGVi−1, the first through (i−2)th green reference gamma voltages GRGV1 through GRGVi−2, the first through (i−1)th blue reference gamma voltages BRGV1 through BRGVi−1, and the first through third common reference gamma voltage CRGV1 through CRGV3.

As illustrated in FIG. 2B, the gamma voltage generating block 220 may include the first sub gamma voltage generating block 221, the second sub gamma voltage generating block 222, and the third sub gamma voltage generating block 223. The first sub gamma voltage generating block 221 may generate the first gamma voltages based on the first through (i−1)th red reference gamma voltages RRGV1 through RRGVi−1, the first common reference gamma voltage CRGV1, and the third common reference gamma voltage CRGV3. The second sub gamma voltage generating block 222 may generate the second gamma voltages based on the first through (i−2)th green reference gamma voltages GRGV1 through GRGVi−2, the first common reference gamma voltage CRGV1, the second common reference gamma voltage CRGV2, and the third common reference gamma voltage CRGV3. The third sub gamma voltage generating block 223 may generate the third gamma voltages based on the first through (i−1)th blue reference gamma voltage levels BRGV1 through BRGVi−1, the second common reference gamma voltage CRGV2, and the third common reference gamma voltage CRGV3.

Figure 2C:
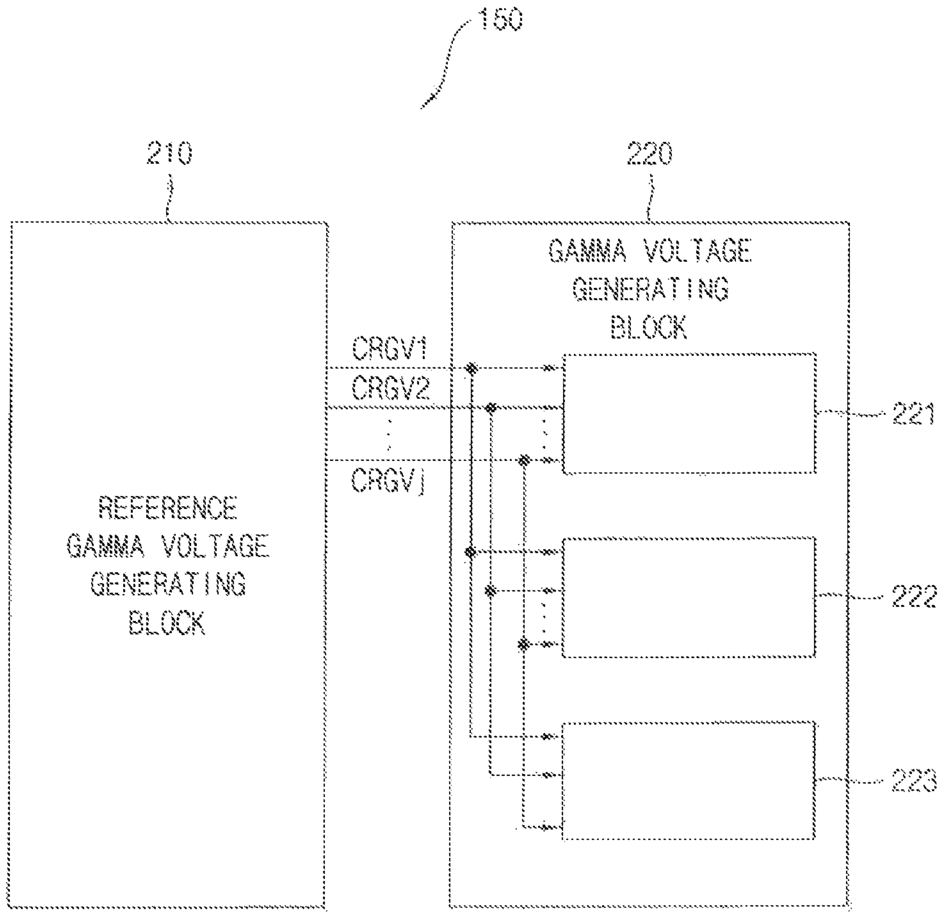
FIG. 2C is a block diagram illustrating an example of a gamma voltage generator included in the display device of FIG. 1 according to an exemplary embodiment of the inventive concept.

FIG. 2C is a block diagram illustrating an example of a gamma voltage generator included in the display device of FIG. 1 according to an exemplary embodiment of the inventive concept.

Referring to FIGS. 2A and 2C, the gamma voltage generator 150 of FIG. 2C may include the reference gamma voltage generating block 210 and the gamma voltage generating block 220. The reference gamma voltage generating block 210 and the gamma voltage generating block 220 illustrated in FIG. 2C may be substantially the same as the reference gamma voltage generating block 210 and the gamma voltage generating block 220 illustrated in FIG. 2A. However, the reference gamma voltage generating block 210 illustrated in FIG. 2C may generate only common reference gamma voltages CRGV1 through CRGVj and the gamma voltage generating block 220 illustrated in FIG. 2C may generate the first through third gamma voltages based on the common reference gamma voltages CRGV1 through CRGVj.

The reference gamma voltage generating block 210 may generate the common reference gamma voltages CRGV1 through CRGVj based on the common reference gamma voltage levels. Here, each of the common reference gamma voltage levels may be equal to at least two among the first reference gamma voltage levels of the first sub pixel, the second reference gamma voltage levels of the second sub pixel, and the third reference gamma voltage levels of the third sub pixel.

For example, the first gamma voltage levels may be substantially equal to the second gamma voltage levels, and the second gamma voltage levels may be substantially equal to the third gamma voltage levels. In other words, the first through third reference gamma voltage levels may include only the common reference gamma voltage levels. In this case, the reference gamma voltage generating block 210 may generate the common reference gamma voltages CRGV1 through CRGVj corresponding to the common reference gamma voltage levels. Therefore, the reference gamma voltage generating block 210 illustrated in FIG. 2C may minimize the number of channels (e.g., output channels).

The gamma voltage generating block 220 may generate the first gamma voltages, the second gamma voltages, and the third gamma voltages based on the common reference gamma voltages CRGV1 through CRGVj.

As illustrated in FIG. 2C, the gamma voltage generating block 220 may include the first sub gamma voltage generating block 221, the second sub gamma voltage generating block 222, and the third sub gamma voltage generating block 223. The first sub gamma voltage generating block 221 may generate the first gamma voltages based on the common reference gamma voltages CRGV1 through CRGVj. The second sub gamma voltage generating block 222 may generate the second gamma voltages based on the common reference gamma voltages CRGV1 through CRGVj. The third sub gamma voltage generating block 223 may generate the third gamma voltages based on the common reference gamma voltages CRGV1 through CRGVj.

As described with reference to FIGS. 2A through 2C, the gamma voltage generator 150, according to an exemplary embodiment of the inventive concept, may set or determine a common reference gamma voltage level which is substantially equal to some reference gamma voltage levels and may generate a common reference gamma voltage based on the common reference gamma voltage level. Therefore, the number of output channels may be reduced.

Figure 3A:
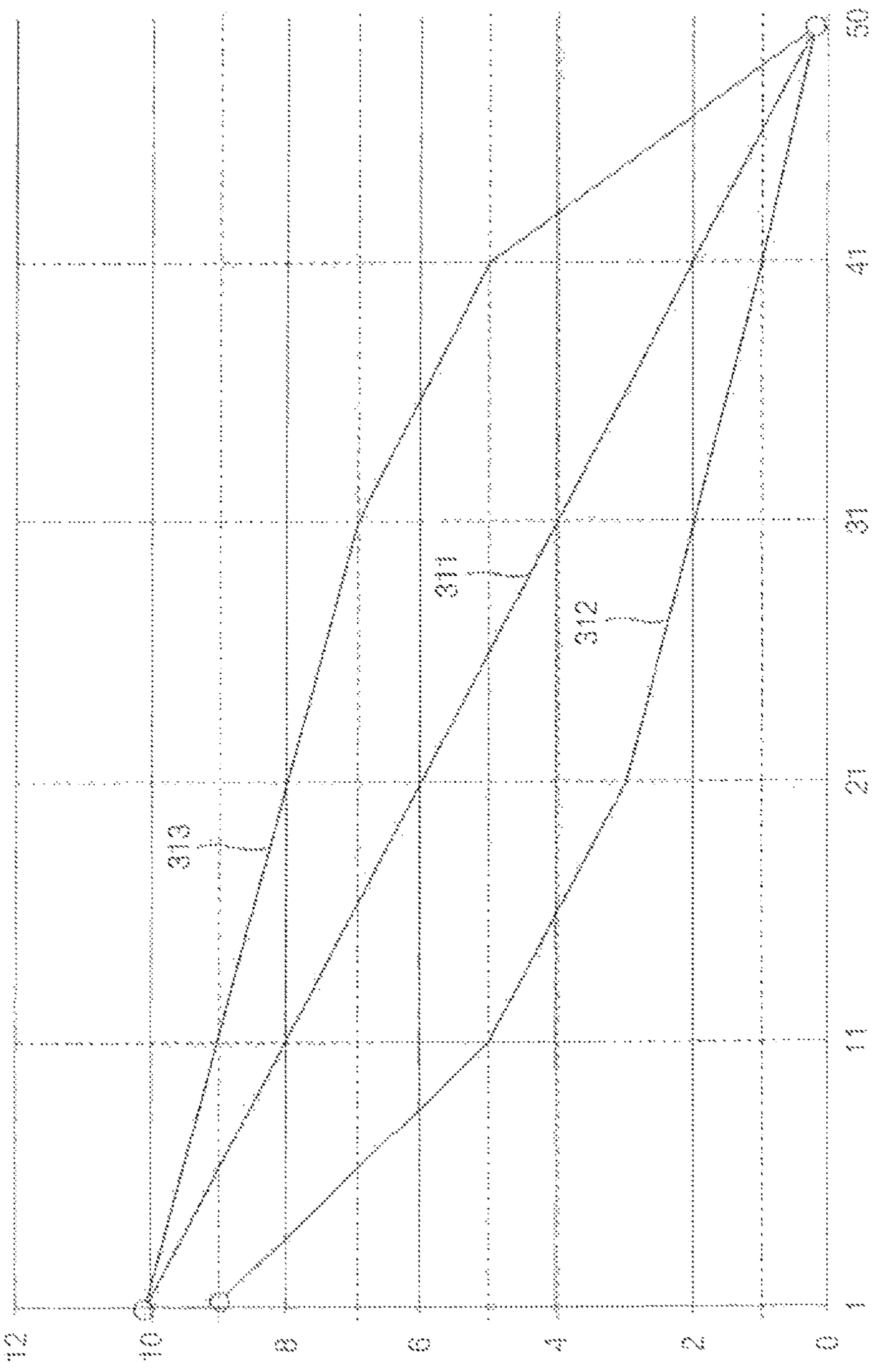
FIG. 3A is a graph illustrating an example of a gamma characteristic curve for each of the sub pixels included in the display device of FIG. 1 according to an exemplary embodiment of the inventive concept.

FIG. 3A is a graph illustrating an example of a gamma characteristic curve for each of the sub pixels included in the display device of FIG. 1 according to an exemplary embodiment of the inventive concept. FIG. 3B is a table illustrating an example of gamma voltages according to the gamma characteristic curve of FIG. 3A. FIG. 3C is a table illustrating an example of gamma voltages generated by a conventional gamma voltage generator. FIG. 3D is a table illustrating an example of gamma voltages generated by the gamma voltage generator of FIG. 2A.

Referring to FIGS. 3A through 3D, a first gamma curve 311 may represent the first gamma characteristic of the first sub pixel. In other words, the first gamma curve 311 may represent first gamma voltages corresponding to grayscale data (or, grayscale values) of the first sub pixel. A second gamma curve 312 may represent the second gamma characteristic of the second sub pixel and may represent second gamma voltages corresponding to grayscale data of the second sub pixel. A third gamma curve 313 may represent the third gamma characteristic of the third sub pixel and may represent third gamma voltages corresponding to grayscale data of the third sub pixel.

For reference, a conventional display device determines reference gamma voltage levels by considering linearity of gamma curves (e.g., identifying portions of gamma curves that are linear). For example, a conventional reference gamma voltage generating block determines or sets an eleventh grayscale value and a twenty-first grayscale value as characteristic points according to the second gamma curve 312 and determines voltage levels (e.g., 5 volt (V) and 3V) corresponding to the characteristic points as the reference gamma voltage levels.

In this case, as illustrated in FIG. 3C, the conventional display device determines first comparative reference gamma voltages RRGV_C as the voltages corresponding to a first grayscale value, an eleventh grayscale value, a twenty-first grayscale value, and a thirty-first grayscale value of the first sub pixel (e.g., 10V, 8V, 6V, and 4V). In addition, the conventional display device generates the first gamma voltages by distributing or interpolating the first comparative reference gamma voltages RRGV_C using resistors which have substantially the same resistance. Similarly, the conventional display device determines second comparative reference gamma voltages GRGV_C as the voltages corresponding to the first grayscale value, the eleventh grayscale value, the twenty-first grayscale value, and the thirty-first grayscale value of the second sub pixel (e.g., 9V, 5V, 3V, and 2V). The conventional display device determines third comparative reference gamma voltages BRGV_C as the voltages corresponding to the first grayscale value, the eleventh grayscale value, the twenty-first grayscale value, and the thirty-first grayscale value of the third sub pixel (e.g., 10V, 9V, 8V, and 7V). In addition, the conventional display device generates the second gamma voltages and the third gamma voltages by distributing or interpolating the second comparative reference gamma voltages GRGV_C and the third comparative reference gamma voltages BRGV_C, respectively, using resistors which have substantially the same resistance.

On the other hand, the display device 100 (or, the gamma voltage generating block 150), according to an exemplary embodiment of the inventive concept, may determine or set the reference gamma voltage levels regardless of the linearity of the first to third gamma curves 311 through 313. As illustrated in FIG. 3B, the display device 100 may determine common reference gamma voltages as voltages which are used in common by all of the sub pixels (e.g., 9V, 7V, 5V, 4V, 1V).

Referring to FIG. 3D, the display device 100 generates the second gamma voltages by distributing or interpolating the second reference gamma voltages GRGV using resistors which have different resistances. However, the inventive concept is not limited thereto. For example, the display device 100 may generate the first gamma voltages by distributing or interpolating the first reference gamma voltages RRGV using resistors which have different resistances. Similarly, the display device 100 may generate the third gamma voltages by distributing or interpolating the third reference gamma voltages BRGV using resistors which have different resistances.

As described with reference to FIG. 1, the display device 100 may generate the first gamma voltages using the first resistor string, the second gamma voltages using the second resistor string, and the third gamma voltages using the third resistor string, According to exemplary embodiments of the inventive concept, the first resistor string, the second resistor string, or the third resistor string may include a first resistor having a first resistance and a second resistor having a second resistance. The first resistance may be different from the second resistance. The first resistance (or, the second resistance) may be proportional to a voltage across the first resistor (or, the second resistor). In other words, the first resistance of the first resistor (or, the second resistance of the second resistor) may be determined in proportion to a gamma voltage which is output through the first resistor (or, the second resistor).

Referring again to FIGS. 3A and 3D, the first gamma curve 311 may have a first gradient in a range of 1 through 50 grayscale values, and the first resistor string may include a first resistor corresponding to the first gradient. For example, a value of the first gradient may be 0.2V/grayscale (e.g., 10V/50 grayscales), and the first resistor string may include the first resistor having a resistance of 20 ohms corresponding to the first gradient.

The first resistor string may include 10 first resistors to distribute a voltage between a first common reference gamma voltage of 9V and a second common reference gamma voltage of 7V, and may include 5 first resistors to distribute a voltage between a third common reference gamma voltage of 5V and a fourth common reference gamma voltage of 4V. In other words, the first resistor string may have resistors to distribute reference gamma voltages, and the number of resistors may be different or varied according to the reference gamma voltages.

Similarly, the second gamma curve 312 may have a second gradient in a range of 1 through 11 grayscale values, and the second resistor string may include a second resistor corresponding to the second gradient. In addition, the second gamma curve 312 may have the first gradient in a range of 12 through 21 grayscale values, and the second resistor string may include the first resistor corresponding to the first gradient. Furthermore, the second gamma curve 312 may have a third gradient in a range of 22 through 50 grayscale values, and the second resistor string may include a third resistor corresponding to the third gradient. For example, a value of the second gradient may be 0.4V/grayscale (e.g., 4V/10 grayscales), and the second resistor string may include the second resistor having a resistance of 40 ohms corresponding to the second gradient. For example, a value of the third gradient may be 0.1V/grayscale (e.g., 3V/30 grayscales), and the second resistor string may include the third resistor having a resistance of 10 ohms corresponding to the third gradient. In other words, as illustrated in FIG. 3D, the second resistor string may include the second resistor of 40 ohms in a range of 1 through 11 grayscale values, the first resistor of 20 ohms in a range of 12 through 21 grayscale values, and the third resistor of 10 ohms in a range of 22 through 50 grayscale values (FIG. 3D only shows up to 31 grayscale values).

The second resistor string may include 5 second resistors to distribute a voltage between the second common reference gamma voltage of 7V and the third common reference gamma voltage of 5V, and may include 30 third resistors to distribute a voltage between the third common reference gamma voltage of 5V and the fourth common reference gamma voltage of 4V. In other words, in the second resistor string, the number of and resistance of resistors to distribute certain reference gamma voltages may be different from the number of and resistance of resistors to distribute other reference gamma voltages.

As described with reference to FIGS. 3A through 3D, the display device 100, according to an exemplary embodiment of the inventive concept, may determine or set the common reference gamma voltages as gamma voltages which are commonly used by the sub pixels, and may distribute or interpolate the common reference gamma voltages and reference gamma voltages using resistors which have different resistances. Therefore, the display device 100 may determine or set the common reference gamma voltage levels regardless of linearity of the gamma characteristic of the pixel P, and may generate the gamma voltages based on the common reference gamma voltage levels.

Figure 4A:
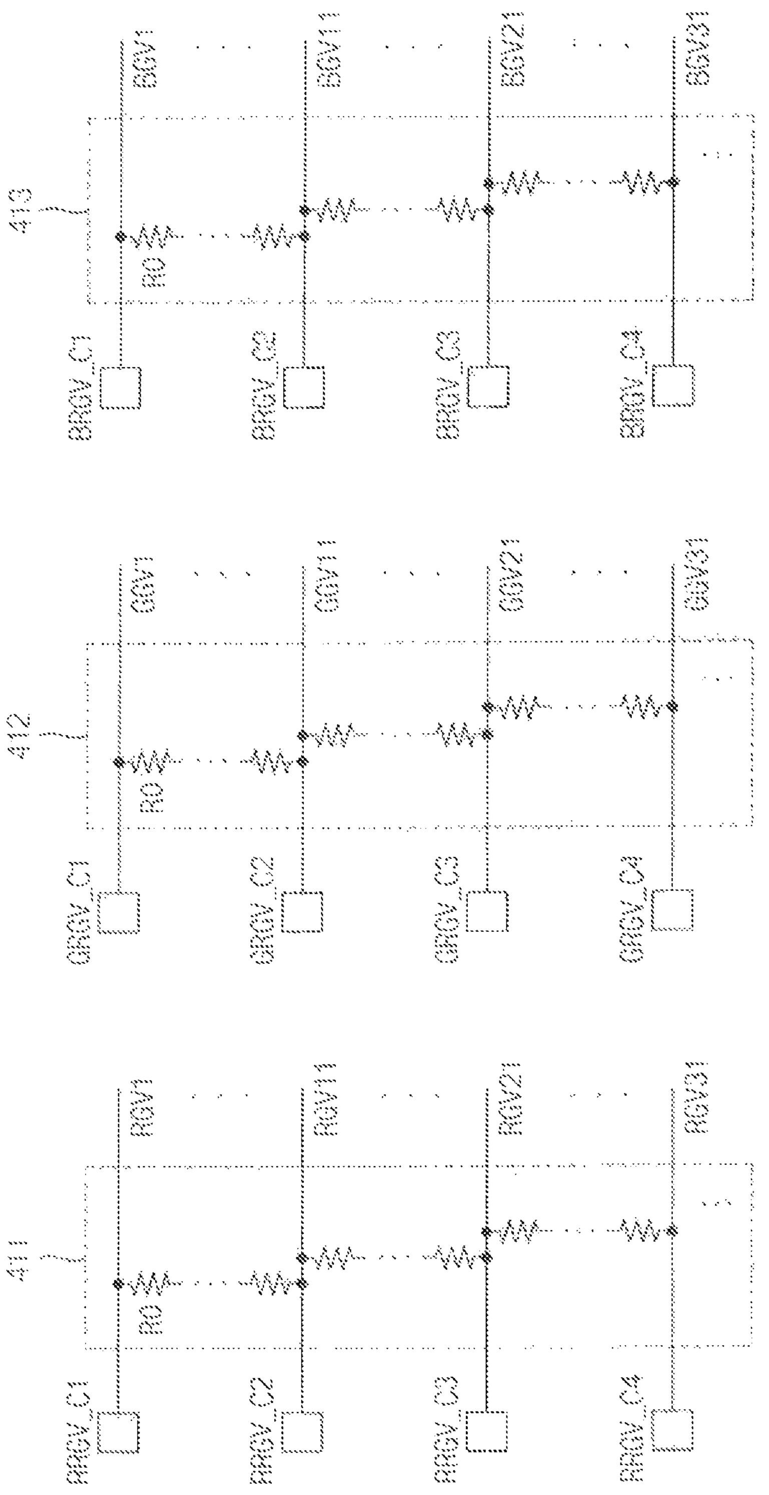
FIG. 4A is a circuit diagram illustrating an example of a conventional gamma generator.

FIG. 4A is a circuit diagram illustrating an example of a conventional gamma voltage generator.

Referring to FIGS. 3C and 4A, a conventional gamma generator may include a first comparative resistor string 411, a second comparative resistor string 412, and a third comparative resistor string 413.

The first comparative resistor string 411 may include reference resistors R0 electrically connected in series. The first comparative resistor string 411 may receive comparative red reference gamma voltages RRGV_C1 through RRGV_C4, and may output or generate red gamma voltages RGV1 through RGV31 by distributing or interpolating the comparative red reference gamma voltages RRGV_C1 through RRGV_C4. For example. the first comparative resistor string 411 may evenly distribute a voltage between the first comparative red reference gamma voltage RRGV_C1 and the second comparative red reference gamma voltage RRGV_C2 using 10 reference resistors R0, and may output first through tenth red gamma voltages RGV1 through RGV10 as voltages across each of the 10 reference resistors R0.

Similarly, the second comparative resistor string 412 may include the reference resistors R0 electrically connected in series, and may output or generate green gamma voltages GGV1 through GGV31 by distributing or interpolating comparative green reference gamma voltages GRGV_C1 through GRGV_C4. The third comparative resistor string 413 may include the reference resistors R0 electrically connected in series, and may output or generate blue gamma voltages BGV1 through BGV31 by distributing or interpolating comparative blue reference gamma voltages BRGV_C1 through BRGV_C4.

In other words, in the conventional gamma voltage generator, comparative resistor strings for each of the sub pixels may have substantially the same structure, and each of the comparative resistor strings may include resistors which have substantially the same resistance. In this case, the conventional gamma voltage generator may be required to determine or set reference gamma voltages as characteristic points which are represented on the gamma characteristic curve of each of the sub pixels. In addition, the conventional gamma voltage generator may be required to generate the reference gamma voltages for each of the sub pixels because characteristics of the sub pixels are different from one another.

Figure 4B:
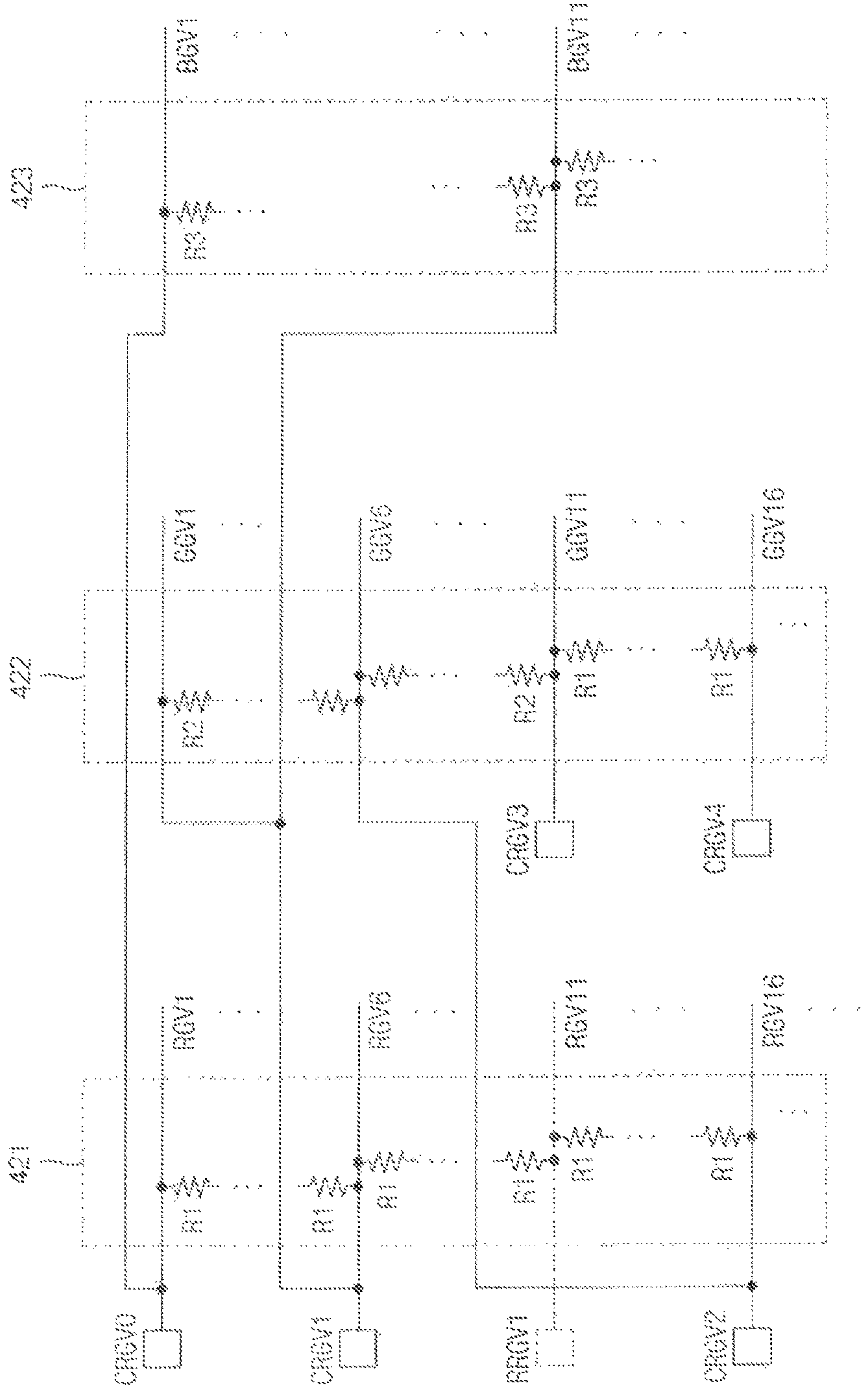
FIG. 4B is a circuit diagram illustrating an example of a gamma voltage generating block included in the gamma voltage generator of FIG. 2A according to an exemplary embodiment of the inventive concept.

FIG. 4B is a circuit diagram illustrating an example of a gamma voltage generating block included in the gamma voltage generator of FIG. 2A according to an exemplary embodiment of the inventive concept.

Referring to FIGS. 2A, 3D, and 4B, the gamma voltage generator 150 may include a first resistor string 421, a second resistor string 422, and a third resistor string 423.

The first resistor string 421 may include first resistors R1 electrically connected in series. The first resistor R1 may have a resistance of 20 ohms. The first resistor string 421 may receive a common voltage CRGV0, a first common reference gamma voltage CRGV1, and a second common reference gamma voltage CRGV2, and may output or generate red gamma voltages RGV1 through RGV16 by distributing a voltage between the common voltage CRGV0, the first common reference gamma voltage CRGV1, and the second common reference gamma voltage CRGV2 (e.g., by interpolating the common voltage CRGV0, the first common reference gamma voltage CRGV1, and the second common reference gamma voltage CRGV2). For example, the first resistor string 421 may distribute a voltage between the common voltage CRGV0 and the first common reference gamma voltage CRGV1 using 5 first resistors R1, and may output first through fifth red gamma voltages RGV1 through RGV5 at terminals of the 5 first resistors R1. For example, the first resistor string 421 may distribute a voltage between the first common reference gamma voltage CRGV1 and the second common reference gamma voltage CRGV2 using 10 first resistors R1, and may output sixth through fifteenth red gamma voltages RGV6 through RGV15 at terminals of the 10 first resistors R1.

According to exemplary embodiments of the inventive concept, the first resistor string 421 may receive a first red reference gamma voltage RRGV1. In this case, the first resistor string 421 may distribute a voltage between the first common reference gamma voltage CRGV1 and the first red reference gamma voltage RRGV1 using 5 first resistors R1, and may output sixth through tenth red gamma voltages RGV6 through RGV10 at terminals of these 5 first resistors R1. In other words, the first resistor string 421 may output the red gamma voltages RGV1 through RGV16 based on a red reference gamma voltage (e.g., the first red reference gamma voltage RRGV1) and common reference gamma voltages (e.g., the first and second common reference gamma voltages CRGV1 and CRGV2).

The second resistor string 422 may include the first resistors R1 and second resistors R2 which are electrically connected in series. The first resistor R1 may have a resistance of 20 ohms, and the second resistor R2 may have a resistance of 40 ohms. The second resistor string 422 may receive first through fourth common reference gamma voltages CRGV1 through CRGV4, and may output or generate green gamma voltages GGV1 through GGV16 by distributing a voltage between the first through fourth common reference gamma voltages CRGV1 through CRGV4. For example, the second resistor string 422 may distribute a voltage between the first common reference gamma voltage CRGV1 and the second common reference gamma voltage CRGV2 using 5 second resistors R2, and may output first through fifth green gamma voltages GGV1 through GGV5 at terminals of the 5 second resistors R2. For example, the second resistor string 422 may distribute a voltage between the third common reference gamma voltage CRGV3 and the fourth common reference gamma voltage CRGV4 using 5 first resistors R1, and may output eleventh through fifteenth green gamma voltages GGV11 through GGV15 at terminals of the 5 first resistors R1.

The third resistor string 423 may include third resistors R3 electrically connected in series. The third resistor R3 may have a resistance of 10 ohms. The third resistor string 423 may receives the common voltage CRGV0 and the first common reference gamma voltage CRGV1, and may output or generate blue gamma voltages BGV1 through BGV16 by distributing a voltage between the common voltage CRGV0 and the first common reference gamma voltage CRGV1. For example, the third resistor string 423 may distribute a voltage between the common voltage CRGV0 and the first common reference gamma voltage CRGV1 using 10 third resistors R3, and may output first through tenth blue gamma voltages BGV1 through BGV10 at terminals of the 10 third resistors R3.

According to exemplary embodiments of the inventive concept, at least one of the first through third resistor strings 421 through 423 may include the first resistor and the second resistor between a first node and a second node. Here, the first node may receive a first common gamma voltage, and the second node may receive a second common gamma voltage. In addition, a voltage difference between the first common gamma voltage and the second common gamma voltage may be relatively low (e.g., the first common gamma voltage may be adjacent to the second common gamma voltage or the voltage difference may be below a predetermined threshold).

For example, the second resistor string 422 may include the first resistor R1 and the second resistor R2 between the first node and the second node. Here, the first node may receive the third common reference gamma voltage CRGV3, and the second node may receive the fourth common reference gamma voltage CRGV4. Resistances of the resistors (e.g., the first resistor R1 and the second resistor R2) which are electrically connected between the nodes (e.g., the first node and the second node) may be determined based on gamma voltages distributed and output through the resistors. Therefore, the resistors may have different resistances.

As described above, the first resistor string 421 through the third resistor string 423 may have different structures and may include different resistors. Therefore, the first resistor string 421 through the third resistor string 423 may generate the gamma voltages based on the common reference gamma voltages (e.g., the first through fourth common reference gamma voltages CRGV1 through CRGV4) and reference gamma voltages, (e.g., the first red reference gamma voltage RRGV1, etc) which are evenly determined.

Therefore, the gamma voltage generator 150, according to an exemplary embodiment of the inventive concept, which includes the first through third resistor strings 421 through 423, may reduce the number of reference gamma voltages. In addition, when the reference gamma voltage generating block 210 included in the gamma voltage generator 150 is implemented as a gamma integrated circuit, the number of output channels of the reference gamma voltage generating block 210 may be minimized.

The present inventive concept may be applied to any display device (e.g., an organic light emitting display device, a liquid crystal display device, etc) that includes a gamma voltage generator. For example, the present inventive concept may be applied to a television, a computer monitor, a laptop, a digital camera, a cellular phone, a smart phone, a personal digital assistant (PDA), a portable multimedia player (PMP), an MP3 player, a navigation system, a video phone, etc.

As described above, according to an exemplary embodiment of the inventive concept, a gamma voltage generator may reduce the number of total channels to output reference gamma voltages and a common reference gamma voltage by determining/setting/generating the common reference gamma voltage as some gamma voltages having substantially the same voltage level, and by outputting the common reference gamma voltage through one channel.

In addition, the gamma voltage generator may determine or set the reference gamma voltages regardless of linearity of a gamma characteristic curve by interpolating/distributing/dividing reference gamma voltages and by generating gamma voltages based on the reference gamma voltages.

Furthermore, production costs of the display device may be reduced by including the above-described gamma generating block of which the number of channels is reduced.

While the inventive concept has been shown and described with reference to the exemplary embodiments thereof, it will be understood by those of ordinary skill in the art that various changes in form and details may be made thereto without departing from the spirit and scope of the present inventive concept as defined by the following claims.

What is claimed is:

1. A gamma voltage generator comprising:

a reference gamma voltage generating circuit configured to generate first reference gamma voltages, second reference gamma voltages, third reference gamma voltages, and a common reference gamma voltage; and a gamma voltage generating circuit configured to generate first gamma voltages, second gamma voltages, and third gamma voltages using the first reference gamma voltages, the second reference gamma voltages, the third reference gamma voltages, and the common reference gamma voltage, wherein the reference gamma voltage generating circuits generates the common reference gamma voltage using a common reference gamma voltage level which is substantially equal to at least two selected reference gamma voltage levels among first reference gamma voltage levels for a first sub pixel, second reference gamma voltage levels for a second sub pixel, and third reference gamma voltage levels for a third sub pixel.

2. The gamma voltage generator of claim 1, wherein the reference gamma voltage generating circuit generates the first reference gamma voltages, the second reference gamma voltages, and the third reference gamma voltages using the first reference gamma voltage levels, second reference gamma voltage levels, and third reference gamma voltage levels, excluding the at least two selected reference gamma voltage levels.

3. The gamma voltage generator of claim 2, wherein the first reference gamma voltage levels are determined using a first gamma characteristic of the first sub pixel, wherein the second reference gamma voltage levels are determined using a second gamma characteristic of the second sub pixel, and wherein the third reference gamma voltage levels are determined using a third gamma characteristic of the first sub pixel.

4. The gamma voltage generator of claim 1, wherein the gamma voltage generating circuit comprises:

a first resistor string configured to generate the first gamma voltages by interpolating the first reference gamma voltages and the common reference gamma voltage; and a second resistor string configured to generate the second gamma voltages by interpolating the second reference gamma voltages and the common reference gamma voltage.

5. The gamma voltage generator of claim 4, wherein the gamma voltage generating circuit further comprises:

a third resistor string configured to generate the third gamma voltages by interpolating the third reference gamma voltages and the common reference gamma voltage.

6. The gamma voltage generator of claim 5, wherein the first resistor string comprises a first resistor having a first resistance and a second resistor having a second resistance, and wherein the first resistance of the first resistor is different from the second resistance of the second resistor.

7. The gamma voltage generator of claim 6, wherein the first resistor and the second resistor are connected between a first node and a second node, wherein the first node receives the common reference gamma voltage, and wherein the second node receives one of the first reference gamma voltages.

8. The gamma voltage generator of claim 6, wherein the first resistance of the first resistor is determined in proportion to a voltage across the first resistor.

9. The gamma voltage generator of claim 1, wherein the reference gamma voltage generating circuit is implemented as a gamma integrated circuit, and wherein the reference gamma voltage generating circuit includes channels to output the first reference gamma voltages, the second reference gamma voltages, the third reference gamma voltages, and the common reference gamma voltage.

10. The gamma voltage generator of claim 9, wherein the gamma voltage generating circuit is included in a driving integrated circuit which is different from the gamma integrated circuit.

11. A gamma voltage generator comprising:

a reference gamma voltage generating circuit configured to generate common reference gamma voltages; and a gamma voltage generating circuit configured to generate first gamma voltages, second gamma voltages, and third gamma voltages using the common reference gamma voltages, wherein the reference gamma voltage generating circuit generates the common reference gamma voltages using common reference gamma voltage levels each of which is substantially equal to at least two selected reference gamma voltage levels among first reference gamma voltage levels for a first sub pixel, second reference gamma voltage levels for a second sub pixel, and third reference gamma voltage levels for a third sub pixel, and wherein the common reference gamma voltage levels are different from one another.

12. The gamma voltage generator of claim 11, wherein the first reference gamma voltage levels are determined using a first gamma characteristic of the first sub pixel, wherein the second reference gamma voltage levels are determined using a second gamma characteristic of the second sub pixel, and wherein the third reference gamma voltage levels are determined using a third gamma characteristic of the third sub pixel.

13. The gamma voltage generator of claim 11, wherein the gamma voltage generating circuit comprises:

a first resistor string configured to generate the first gamma voltages by interpolating the common reference gamma voltages;

a second resistor string configured to generate the second gamma voltages by interpolating the common reference gamma voltages; and a third resistor string configured to generate the third gamma voltages by interpolating the common reference gamma voltages.

14. The gamma voltage generator of claim 13, wherein the first resistor string includes a first resistor having a first resistance and a second resistor having a second resistance, and wherein the first resistance of the first resistor is different from the second resistance of the second resistor.

15. The gamma voltage generator of claim 14, wherein the first resistor and the second resistor are connected between a first node and a second node, wherein the first node receives a first common reference voltage among the common reference gamma voltages, wherein the second node receives a second common reference voltage among the common reference gamma voltages, and wherein a voltage difference between the first common reference gamma voltage and the second common reference gamma voltage is less than a predetermined threshold.

16. The gamma voltage generator of claim 14, wherein the first resistance of the first resistor is determined in proportion to a voltage across the first resistor.

17. The gamma voltage generator of claim 11, wherein the reference gamma voltage generating circuit is implemented as a gamma integrated circuit, and wherein the reference gamma voltage generating circuit includes channels to output the common reference gamma voltages.

18. The gamma voltage generator of claim 17, wherein the gamma voltage generating circuit is included in a driving integrated circuit which is different from the gamma integrated circuit.

19. A display device comprising:

a display panel including a first sub pixel, a second sub pixel, and a third sub pixel;

a gamma voltage generator configured to generate first gamma voltages for the first sub pixel, second gamma voltages for the second sub pixel, and third gamma voltages for the third sub pixel; and a data driver configured to generate a data signal in response to the first gamma voltages, the second gamma voltages, the third gamma voltages, and input image data provided from an external device, wherein the gamma voltage generator comprises:

a reference gamma voltage generating circuit configured to generate first reference gamma voltages, second reference gamma voltages, third reference gamma voltages, and a common reference gamma voltage; and a gamma voltage generating circuit configured to generate the first gamma voltages, the second gamma voltages, and the third gamma voltages using the first reference gamma voltages, the second reference gamma voltages, the third reference gamma voltages, and the common reference gamma voltage, and wherein the reference gamma voltage generating circuit generates the common reference gamma voltage using a common reference gamma voltage which is substantially equal to at least two selected reference gamma voltage levels among first reference gamma voltage levels for the first sub pixel, second reference gamma voltage levels for the second sub pixel, and third reference gamma voltage levels for the third sub pixel.

* * * * *